Nov. 22, 1955     E. E. HAGELINE     2,724,529
LIQUID FEED CONTROL AND MEASURING DEVICE
Filed Aug. 5, 1950
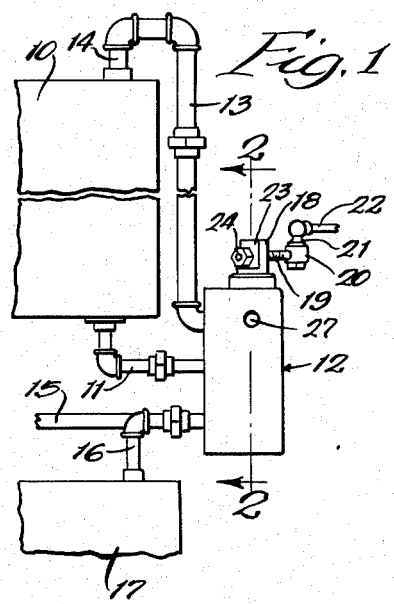
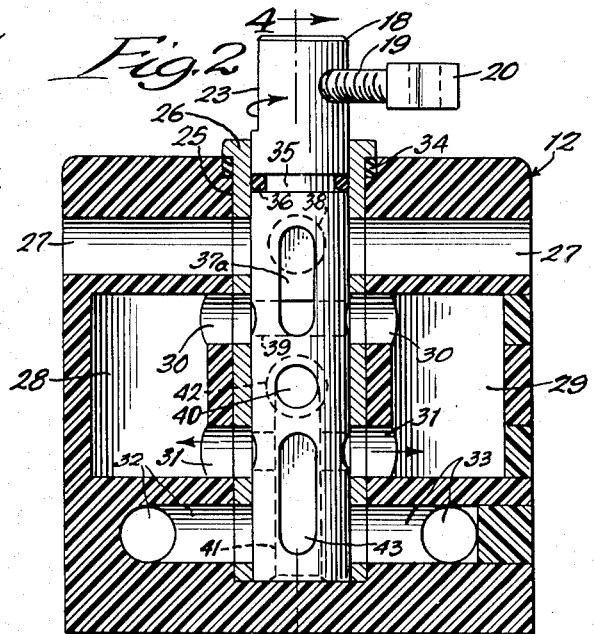
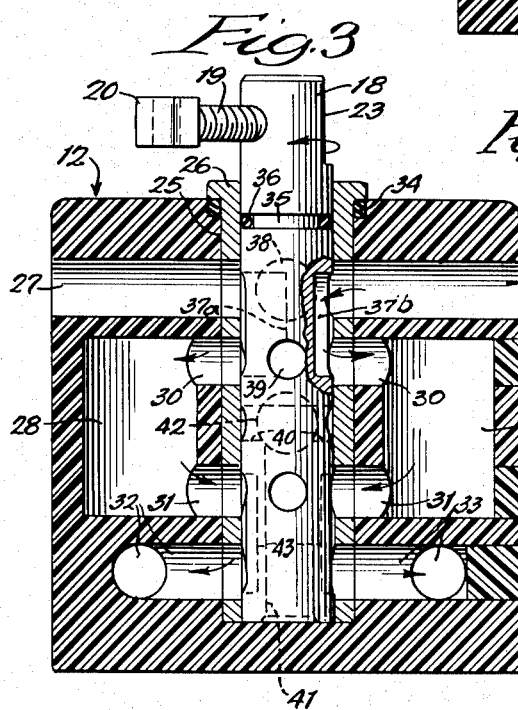
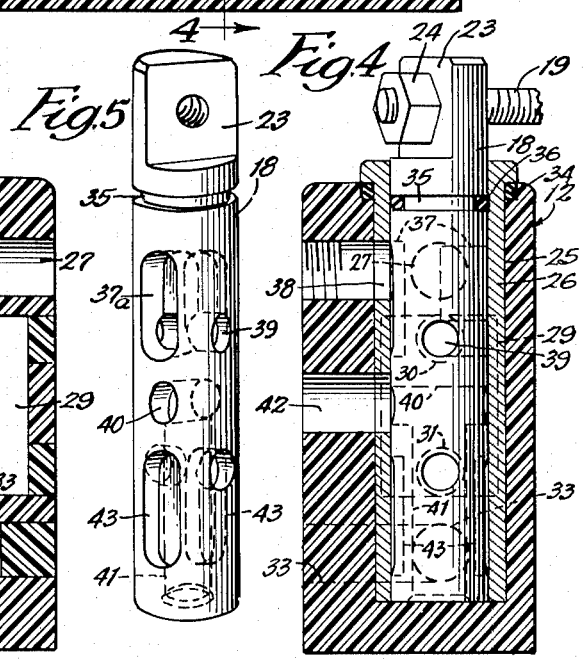
INVENTOR:
Emil E. Hageline,
BY Dawson & Ooms
ATTORNEYS.

United States Patent Office 2,724,529
Patented Nov. 22, 1955

2,724,529

LIQUID FEED CONTROL AND MEASURING DEVICE

Emil E. Hageline, Chicago, Ill., assignor to The Lathrop-Paulson Company, Chicago, Ill., a corporation of Illinois Application August 5, 1950, Serial No. 177,819

3 Claims. (Cl. 222—427)

This invention relates to a liquid feed control and measuring device. The invention is particularly useful in providing a measured liquid feed to be supplied intermittently to can washing apparatus and like machines.

Reference is made to my copending application Serial No. 747,871, filed May 13, 1947, now Patent 2,535,204.

In the washing of milk cans and other vessels by machines, it is common to supply a special washing fluid, known generally as "acid cleaner," to the machine at various points. For example, a measured quantity of the material is supplied to the interior of a can in conjunction with steam shortly after the can enters the machine. Again, a measured quantity of the acid is discharged into a rinse receptacle where it is mixed with water and a solution applied in the later rinsing step. The apparatus is so designed that a measured quantity of the liquid is supplied only when a can is in position for treatment. In the supply of such liquid, a valve is actuated to allow the liquid to flow from a container into a measuring vessel, and later the measuring vessel is emptied. Such apparatus is efficient when the liquid level in the supply tank remains at a constant level, but it becomes inefficient when the level in the tank varies widely. In other words, the pressure or head provided by the liquid body in the container affects the amount of liquid that enters the measuring vessel, and thus a variation in such head produces a variation in the quantity of liquid fed at each feeding interval. Similar inequalities in the quantity of liquid fed have been found in milk samplers and in many other measuring devices to which the present invention is equally applicable.

An object of the present invention is to provide mechanism for overcoming the above defects and for feeding an exact quantity of liquid at each feeding interval, while at the same time greatly reducing the sealing surfaces and the area of the moving control parts. A further object is to provide new and efficient mechanism for quickly filling measuring containers and discharging the same with a minimum of mechanical movement and with high accuracy in the quantity of liquid fed. Yet another object is to provide measuring mechanism in conjunction with a supply tank whereby a column of liquid completely filling each measuring vessel or chamber is maintained and whereby a complete emptying of the chambers is brought about at selected intervals to isolate that portion of the column of liquid within the chambers only and to divert it to the desired conduit. Yet another object is to provide a structure in which the main body of the metering device is stationary and a relatively small control member is rotated to effect the isolation of the column of liquid within the chambers, the admission of air to the top of the chambers, and the opening of a passage for the outflow of liquid from the chambers. Other specific objects and advantages will appear as the specification proceeds.

The invention is shown in an illustrative embodiment, by the accompanying drawing, in which—

Fig. 1 is a broken side view in elevation of the feed apparatus embodying my invention; Fig. 2, a vertical sectional view, the section being taken as indicated at line 2—2 of Fig. 1; Fig. 3, a broken sectional view similar to Fig. 2 but showing the valve moved to discharging position; Fig. 4, a vertical sectional view, the section being taken as indicated at line 4—4 of Fig. 2; and Fig. 5, a perspective view of the valve.

In the illustration given, 10 designates a supply tank which is preferably supported in the can washing machine or other apparatus at a relatively high level and may contain a concentrated washing material or other suitable liquid. A conduit 11 leads from the tank 10 and enters the measuring device or block 12. The conduit 11 communicates through passages and chambers in block or casing 12 with a standpipe 13 which preferably is provided at its top with a downwardly-turned end portion 14 for discharge into the tank. It will be understood, however, that normally there will be no discharge into the tank and that the level of the liquid in the tank will be substantially the same as the level of the liquid in the pipe 13. In effect, the conduit 11, casing 12, and pipe 13 together provide a system of passages in which the liquid level of the tank 10 produces a similar liquid level in the standpipe 13, and when the chambers within the casing 12, as will be later described, are filled or emptied, the level within the pipe 13 is constantly restored by the inflow of liquid into casing 12 under the hydrostatic head of the liquid in tank 10.

The casing 12 of the measuring device is provided at its bottom with an outlet pipe 15 leading to one portion of the apparatus, as, for example, to a mixing valve where the fluid is mixed with steam that is to be discharged into a can. The casing is also provided with another outlet pipe 16 which may lead to any other part of the apparatus, as, for example, to a tank 17.

The machine is equipped with means for actuating the feed device so as to feed liquid intermittently from the casing 12 in measured increments, the liquid flowing out simultaneously through the pipes 15 and 16. In the specific illustration given, the control valve 18 is apertured to receive a threaded rod 19 equipped at its end with a sleeve 20. A connecter member 21 is joined to a rod 22 which is reciprocated by the action of the machine (not shown) for the rotation of the control valve 18. In the specific illustration given, the control valve is cut away on one side to provide a flat face 23 through which the threaded end of the rod 19 extends and a lock nut 24 secures the end of the rod 19 and bears against the flat face 23 of the valve 18. It will be understood that any suitable means may be provided for rotating the valve for the feeding of the increments of liquid.

The casing or block 12 may be formed of any suitable material. In the specific illustration given, the casing body is formed of a transparent plastic, such as Lucite, or any other suitable material. The transparent body 12 enables the operator to observe the filling and emptying of the chambers and to verify their complete filling and emptying during the operative strokes.

In the specific illustration given, the casing or body 12 is provided with a vertical recess 25 adapted to receive the valve sleeve 26. The body 12 is also provided near the top with a transverse passage 27 which may be designated as an air passage or air vent, since this passage is open to the atmosphere. Below the passage 27 are formed the metering or measuring chambers 28 and 29. Each of these chambers is provided at its top with an inlet passage 30 and at its bottom with an outlet passage 31.

Below the chambers 28 and 29 are outlet passages 32 and 33. The passage 32 communicates with the outlet pipe 15 and the outlet passage 33 communicates with outlet pipe 16 (shown in Fig. 1).

The valve sleeve is tightly secured within the vertical recess 25 of the valve body 12 so as to form a friction fit therewith and the upper end of the sleeve is preferably provided with a sealing ring 34. The sleeve 26 thus forms a part of the body or casing 12 and is thus a stationary part of the structure. It is formed throughout with openings perfectly aligned with the openings and passages in the valve casing 12. The sleeve provides a metal bearing for the rotatable valve 18 and in effect provides an inner wearable surface for the plastic block 12. The sleeve 26 and the valve 18 may be formed of stainless steel or other suitable material.

The valve 18 is designed to fit snugly within the cylindrical sleeve 26 for rotation therein. I prefer to equip the upper end of the valve 18 with an annular recess 35 in which a sealing ring 36 is received.

As shown more clearly in Figs. 3 and 5, the valve 18 is provided in its upper portion with vertically extending slots 37a and 37b. The upper end of each slot, when the valve is turned to the position illustrated in Fig. 3, communicates with the air vent 27 so as to vent both of the chambers 28 and 29 simultaneously. A horizontal opening 38 extending through the sleeve 26 and the body 12 and receiving the lower, turned end of pipe 13, is adapted to be brought into communication with slot 37a. Slot 37a at its lower end is adapted to communicate with a laterally turned passage 39. The passage 39 extends entirely through the valve 18 and provides communication between the vertical recess 37a and each of the valve chambers 28 and 29. Thus, in the filling position shown in Fig. 2, liquid may flow from the chambers 28 and 29 inwardly through the passage 39 and thence upwardly through the vertical recess 37a and outwardly through the passage 38 into the vertical pipe 13. Similarly, liquid is free to flow from the pipe 13 downwardly through these passages and into the chambers 28 and 29.

At about the center of the valve 18 there is an intake passage 40 which communicates on its interior with a downwardly-extending passage 41. The passage 41 communicates with the chamber outlets 31 through cross-passage 44. In the filling operation chamber outlets 31 actually serve as inlets for the chambers. The passage 40 in the valve 18 communicates through an opening 42 in the sleeve 26 and the valve casing 12 and the opening 42 receives the conduit 11 communicating with the bottom of the liquid supply tank 10. Thus, in the filling operation, liquid normally flows from the supply tank through the outlet 11, casing passage 42, and thence through the valve passage 40 and the downwardly-extending passage 41 into the lower portion of the chambers 28 and 29 through cross-passage 44 and outlets 31. The liquid flows upwardly, filling the chambers, and thence outwardly through the passages 30 into the vertical recess 37 and thence out through passage 38 into standpipe 13. In this position, as represented best by Figs. 2 and 4, the structures 11, 12 and 13 form in effect a standpipe system with the liquid filling these pipes and the chambers 28 and 29.

For the next operation, it is desired to isolate the chambers so that they become measuring members containing their segment of the column of liquid, to admit air to the chambers, while at the same time connecting the outlets of the chambers with the outlet passages 32 and 33.

The valve 18 is provided on opposite sides thereof with elongated recesses 43 which are adapted to be brought into alignment with the chamber outlets 31 and the outlet passages 32 and 33 therebelow, upon the rotation of valve 18 to the discharge position illustrated in Fig. 3. The turning of the valve 18 to the position shown in Fig. 3 closes the inlet passages 38 and 42. At the same time, the vertical recesses 37a and 37b, after being turned through an arc of forty-five degrees, are brought into alignment with the air vent passage 27 and air flows inwardly through the passage 27 and downwardly through the recesses 37a and 37b to each of the inlet ports 30 of chambers 28 and 29. The liquid thus flows freely and completely from the measuring chambers 28 and 29 through the outlet passages 31 and thence through the respective outlet passages 32 and 33 which communicate with pipes 15 and 16, respectively.

*Operation*

In the operation of the apparatus, when the valve is swung to the position shown in Figs. 2 and 4, liquid flows from the tank 10 through conduit 11 and inwardly along the course described to fill the chambers 28 and 29. Similarly, the liquid is free to flow upwardly through the vertical recess 37a, outlet 38, and into the pipe 13 to bring the liquid level in pipe 13 to a point in line with that of the liquid level in the tank. If, during the filling operation, liquid flows downwardly from pipe 13 into the chambers 28 and 29, to this extent the level within the pipe is reduced. However, the inflow of liquid through the pipe outlet restores the liquid level within pipe 13.

When the valve 18 is moved to the discharge position shown in Fig. 3, the intake passages 38 and 42 are closed off, thus isolating the liquid within the chambers 28 and 29. At the same time, the vertical recesses 37a and 37b are now aligned with the air vent 27 and air is admitted into the upper portion of each chamber. The liquid is now free to flow from the chambers through the vertical recesses 43 and out through the separate outlets 32 and 33.

The foregoing valve operations are accomplished with a relatively small movement of the valve plug 18. By adjusting the screw rod 19 with respect to the actuating member 22, so as to lengthen or shorten the rod, the extent of rotation of valve 18 may be further controlled so that the increments of liquid may be fed at shorter or longer intervals. The adjustment may be accomplished by disconnecting the rod 19 and rotating it in the desired direction for lengthening or shortening it with respect to the valve 18. When adjusted to the desired length, the lock nut 24 is secured to maintain the rod 19 in the selected position.

With the standpipe structure shown, there is maintained a continuous column of liquid. By isolating the chambers, an accurate volume of liquid is fed in each operation and irrespective of the level of liquid within the supply tank 10. The filling of the chambers is accomplished readily and from each end of the chamber. With the structure shown, the control is effected through the use of an extremely small valve plug or rod rotated in the center of a fixed valve body.

While in the foregoing specification I have set out a specific structure in considerable detail for the purpose of illustrating an embodiment of the invention, it will be understood that such details of structure may be varied widely by those skilled in the art without departing from the spirit of my invention.

I claim:

1. In liquid feed apparatus, a liquid supply tank, a pipe leading from the lower portion of said supply tank to a lower point, a second pipe extending upwardly from a point adjacent the outer end portion of said first pipe to provide a standpipe for maintaining a liquid level therein corresponding to the liquid level in said supply tank, a feed device interposed between the outer end of said first pipe and the lower end of said second pipe, said feed device providing chambers communicating at their bottoms with said first pipe and at their tops with said second pipe, and a valve rotatably mounted between said chambers and establishing open communication between said second pipe and said chambers when said valve is in one position and isolating said chambers from said second pipe when the valve is in another position, said valve when in said other position opening the bottom of said chambers to permit the outflow of liquid therefrom and when in said one position opening the bottom of the chambers to permit inflow of liquid into said chambers from said first pipe.

2. In liquid feed apparatus, a liquid supply tank, a pipe leading from the lower portion of said supply tank to a lower point, a second pipe extending upwardly from a point adjacent the outer end portion of said first pipe to provide a standpipe for maintaining a liquid level therein corresponding to the liquid level in said supply tank, a feed control casing interposed between the outer end of said first pipe and the lower end of said second pipe, said casing providing chambers communicating at their lower portions with said first pipe and at their top portions with said second pipe, said casing being provided with an air vent and with outlet passages, and a valve rotatably mounted in said casing and provided with passages for establishing open communication between said chambers and said second pipe when said valve is in one position and sealing said chambers from said second pipe when said valve is in a different position, said valve when in said different position establishing communication between said chambers and said air vent passage and between the lower portion of said chambers and said outlet passages, said valve comprising a solid cylindrical body having passages extending therethrough for alignment with said first and second pipes, said air vent passage, and said chambers and outlet passages, said valve when in said one position also establishing open communication between said chambers and said first pipe and sealing said chambers from said first pipe when the valve is in said different position.

3. In liquid feed apparatus, a liquid supply tank, a pipe leading from the lower portion of said supply tank to a lower point, a second pipe extending upwardly from a point adjacent the outer end portion of said first pipe to provide a standpipe for maintaining a liquid level therein corresponding to the liquid level in said supply tank, a feed control casing interposed between the outer end of said first pipe and the lower end of said second pipe, said casing providing chambers communicating at their lower portions with said first pipe and at their top portions with said second pipe, said casing being provided with an air vent and with outlet passages, and a valve rotatably mounted in said casing and provided with passages for establishing open communication between the upper portion of said chambers and said second pipe and the lower portion of said chambers and said first pipe when said valve is in one position and sealing said chambers from said first and second pipes when said valve is in a different position, said valve when in said different position establishing communication between said chambers and said air vent passage and between the lower portion of said chambers and said outlet passages.

References Cited in the file of this patent

UNITED STATES PATENTS

| | | |
|---|---|---|
| 80,852 | Blake et al. | Aug. 11, 1868 |
| 394,391 | Perkins | Dec. 11, 1888 |
| 645,763 | Sundh | Mar. 20, 1900 |